United States Patent [19]

Neti et al.

[11] 3,787,309

[45] Jan. 22, 1974

[54] SPECIFIC ION ELECTRODE AND METHOD OF MAKING SAID ELECTRODE

[75] Inventors: Radhakrishna Murty Neti, Brea; Kenneth B. Sawa, Buena Park; Colin C. Bing, Placentia, Calif.

[73] Assignee: Beckman Instruments, Inc., Fullerton, Calif.

[22] Filed: May 30, 1972

[21] Appl. No.: 257,987

Related U.S. Application Data

[63] Continuation of Ser. No. 68,587, Aug. 31, 1970, abandoned.

[52] U.S. Cl. .............................. 204/195 M, 29/592
[51] Int. Cl. ............................................ G01n 27/46
[58] Field of Search .......... 204/1 T, 195 M; 324/29; 29/592

[56] References Cited
FOREIGN PATENTS OR APPLICATIONS

| | | | |
|---|---|---|---|
| 1,402,343 | 5/1965 | France | 204/195 |
| 1,505,744 | 12/1967 | France | 252/12 |

OTHER PUBLICATIONS

M. Mascini et al., Analytica Chimica Acta, Vol. 47, No. 2, pp. 339–345, Sept. 1969.

E. Pungor, Analytical Chemistry, Vol. 39. No. 13, pp. 28A–34A, 37A, 39A, 40A and 42A–45A, Nov. 1967.

Arthur K. Covington, "Ion–Selective Electrodes," Nat. Bureau of Stand., Special Pub. 314, pp. 89–106, Nov. 1969.

*Primary Examiner*—G. L. Kaplan
*Attorney, Agent, or Firm*—Stanley M. Teigland

[57] ABSTRACT

A diffusion membrane material for a specific ion electrode which comprises a polymeric resin and a substantially water insoluble salt of the ion to be detected in admixture therewith. A method of making a diffusion membrane material for a specific ion electrode is also disclosed. The method comprises the steps of mixing a polymeric resin with a substantially insoluble salt of the ion to be detected. The resultant mixture is molded and sintered to provide a bar stock and the bar stock is formed into a diffusion membrane material.

20 Claims, No Drawings

SPECIFIC ION ELECTRODE AND METHOD OF MAKING SAID ELECTRODE

This is a continuation of our copending application Ser. No. 68,587, filed Aug. 31, 1970, now abandoned.

BACKGROUND OF THE INVENTION

The instant invention relates to specific or selective ion electrodes. It is particularly directed to a diffusion membrane material useful in such electrodes and a method for making the material.

Specific ion electrodes consist of an insulating glass or plastic tube sealed across one end by a membrane of some type. The tube desirably contains a solution of the ion to be measured and a calomel or silver-silver chloride internal reference electrode.

A voltmeter is used to measure the potential developed between the specific ion electrode and an external reference electrode when the pair is immersed in a solution. The specificity, or selectivity, of the system depends upon the membrane. The membrane functions as a barrier, allowing only the desired ion to pass by diffusion between the sample and the internal filling solution. The diffusion results from a difference in activity between the two solutions. When the activity of the ion in the sample solution exceeds that in the internal solution, there is a net diffusion of ions into the electrode. The transport of ions continues until a state of equilibrium is reached. The electric potential developed across the membrane prevents a further net diffusion of ions. The value of the membrane potential varies with the concentration of the ion in the sample, as discussed in detail in Weber, Specific Ion Electrodes in Pollution Control, Am. Laboratory, July 1970, pp. 15–23.

Specific ion electrodes in general use today can be broadly divided into three different types. The first type is that known as the glass electrode type and the second type is the solid state precipitate electrode. The third type is the liquid-liquid membrane electrode.

The glass electrode is generally limited to the detection of hydrogen, hydroxyl, sodium and potassium ions.

A solid state precipitate electrode generally has an inorganic crystal membrane. The membrane is a thin layer of a crystal that has a mobile ion in its lattice which is free to move from one vacant site to another.

Liquid-liquid membrane electrodes utilize liquid ion exchange membranes. These are composed of an inert porous plastic substrate saturated with a water immiscible organic solvent. A high molecular weight organic salt of the desired ion is dissolved in the solvent. The selectivity of these electrodes depends upon the ability of the organic groups to form a stable complex with the ion sought but not with other ions which may be present in the sample.

A wide variety of electrodes may be prepared which fit the general categories 2 and 3 above. Both fit the general category of membrane electrodes as discussed in D. J. G. Ives and G. J. Jans Editors, Reference Electrodes, Chapter 9, pages 411 et seq., Academic Press, New York, 1961. As stated therein, the selectivity of the membrane towards different ionic species is governed by the same factors which control the ionic permeability of membranes. Thus membranes of ion exchange materials function reproducibly and selectively as membrane electrodes over a wide range of concentrations of individual ionic species. One way of preparing such a membrane is as a homogeneous sheet or film of porous cross linked polymer material, the pores of which are charged with fixed carboxylic or sulfonic acid groups, i.e., cation selective membranes or amino groups in the -onium form, i.e., anion selective membranes. These groups are accessible to all but the largest ions. Alternatively a heterogeneous membrane can be made by impregnating a porous polymer material with absorbable polyelectrolyte or by incorporating particles or beads of ion exchange resin into an inert plastic matrix by molding the beads and plastic binder in a suitable press. Even stronger membranes can be made by supporting the ion exchange material either in a rigid matrix such as a porous glass disc, as a molded plug of resin beads in a thermoplastic binder, or as a rubberish sheet of resin impregnated plastic material which can also be mounted between flanges. Membranes have been prepared of paraffin wax supported on a gauze and containing a suspension of calcium oxalate. A similar impregnate of barium sulfate has also been tried. It was found these membranes could be used as indicator electrodes in titrations but were not satisfactory as membrane reference electrodes or as specific ion electrodes.

SUMMARY OF THE INVENTION

It is an object of this invention to provide an improved selective or specific ion electrode which overcomes many of the disadvantages of the prior art electrodes. It is a further object of the instant invention to provide a method of making a diffusion membrane material for a specific ion electrode.

It is an advantage of the instant invention that the electrodes made from this material are extremely rugged and can be used in various experimental conditions and environments such as acids, alkalis, and organic solvents. The electrodes made from the diffusion membrane material according to the instant invention desirably have relatively low electrical impedance and therefore do not present shielding problems in actual measurements. The type of electrode which can be prepared by this technique is not limited. It is a further advantage of the instant invention that the electrodes can be used over a wide temperature range and there is no leakage of ion exchange liquid. The electrodes advantageously can be used in relatively high oressure applications where the liquid ion exchange electrodes are not suitable. Electrodes advantageously can be prepared from the diffusion membrane material according to the instant invention for the detection of either anions or cations.

Other objects and advantages of this invention will be apparent from the detailed description following.

DETAILED DESCRIPTION

In accordance with the instant invention a diffusion membrane material for a specific ion electrode is prepared by mixing a polyfluoroalkene resin with a substantially water insoluble salt of the ion to be detected. Polytetrafluoroethylene, frequently referred to under the trade name Teflon, is particularly suitable. Many substantially water insoluble salts of the ion to be detected may be used. For example, aluminum phosphate, lanthanum fluoride, barium sulfate, silver chloride, silver bromide, silver iodide, and cadmium phosphate are all usable according to the instant invention.

If sulfate ion is being detected, barium sulfate may be used. If chloride ion is to be detected silver chloride may be used. The amount of salt used should be kept to a range which will not impair the structural strength of the diffusion membrane material. For example the salt desirably is in the form of particles of a size of about 10 to about 1,000 microns. After mixing the salt will have a particle size range from less than about $1 \times 10^{-4}$ to about $50 \times 10^{-4}$ centimeters. The salt desirably comprises from about 20 percent to about 75 percent with 30 percent by weight of the mixture being the best compromise of properties.

The mixture is then molded and sintered together. Appropriate molding pressures are in the range from about 6,000 pounds to about 20,000 pounds per square inch. The bar stock is then formed into a diffusion membrane material in any appropriate manner. For example, discs which may be inserted at the base of a glass tube or at the base of a glass or plastic electrode body may be formed. Other shapes may also be formed as desired for a particular diffusion membrane. The membrane thickness may be from about 0.030 inches to about 0.25 inches without significant effect on the potential span of the electrode.

By way of example and not by limitation an electrode for determining sulfate ions was fabricated by mixing powdered polytetrafluoroethylene in the form of filaments having an average length of 35 microns (Teflon T-7) with 30 percent by weight of 600 mesh barium sulfate in the manner described above. The resultant mixture was molded into a rod as described at a pressure of 6,500 psi and an entire electrode body was machined from the bar stock. A 1 molar potassium sulfate solution, containing 0.1 M potassium chloride to set the potential of the internal half cell, was used as the internal electrolyte in the sulfate ion electrode in the manner known to those skilled in the art. The sulfate ion electrodes showed a potential difference of 22 millivolts when the concentration of the external magnesium sulfate solution was changed from $10^{-3}$ to $10^{-2}$ molar. This was less than the theoretical value but in satisfactory agreement therewith.

In another series of tests 500 micron powdered polytetrafluoroethylene in the form of cylindrical particles (Teflon T6C) was used. Electrodes were fabricated as above from the powder mixed with varying quantities of 600 mesh barium sulfate. The concentration of barium sulfate was varied from 20 to 75 percent by weight at which concentration the electrode became structurally unstable. 30 percent seemed the optimum concentration from both a mechanical and an electrical response standpoint. When the same internal electrolyte as described above was used, the sulfate electrodes also showed a potential difference of 22 millivolts when the concentration of the external magnesium sulfate solution was changed from $10^{-3}$ to $10^{-2}$ molar.

In the next series of tests, electrodes were prepared as above from a mixture of 50 percent barium sulfate (600 mesh), balance Teflon T-7. The membrane was 0.125 inches thick. Using the same internal electrolyte as above the potential difference was measured as the concentration of the external magnesium sulfate solution was changed. The results are shown in Table I.

TABLE I

| Change in Concentration Moles | Potential Difference Millivolts |
| --- | --- |
| $10^{-1}$ to $10^{-2}$ | 34.8 |
| $10^{-2}$ to $10^{-3}$ | 25.2 |
| $10^{-3}$ to $10^{-4}$ | 4.8 |
| $10^{-4}$ to $10^{-5}$ | 2. |

The deviation from the theoretical value (29.6 mv) as the solubility limit is approached is within that expected.

Electrodes were prepared as above from mixtures of 50 percent lanthanum fluoride (400–600 mesh), balance Teflon T-7, and mixtures of 25 percent lanthanum fluoride, balance Teflon T-7. The internal electrolyte contained 1 part per million fluoride ion as sodium fluoride in a 4 molar potassium chloride solution. The membrane thickness varied from 0.0625 inches to 0.25 inches. Potential differences were measured as the concentration of an external sodium fluoride solution was changed as shown in Table II.

TABLE II

| Lanthanum Fluoride In Electrode Percent | Membrane Thickness Inches | Change In Concentration Moles | Potential Difference Millivolts |
| --- | --- | --- | --- |
| 50 | 0.0625 | $5.1 \times 10^{-5}$ to $5.1 \times 10^{-4}$ | 15 |
| 50 | 0.0625 | $5.1 \times 10^{-4}$ to $5.1 \times 10^{-3}$ | 55 |
| 50 | 0.125 | $5.1 \times 10^{-5}$ to $5.1 \times 10^{-4}$ | 17 |
| 50 | 0.125 | $5.1 \times 10^{-4}$ to $5.1 \times 10^{-3}$ | 63 |
| 50 | 0.25 | $5.1 \times 10^{-5}$ to $5.1 \times 10^{-4}$ | 14 |
| 50 | 0.25 | $5.1 \times 10^{-4}$ to $5.1 \times 10^{-3}$ | 58 |
| 25 | 0.0625 | $5.1 \times 10^{-5}$ to $5.1 \times 10^{-4}$ | 1 |
| 25 | 0.0625 | $5.1 \times 10^{-4}$ to $5.1 \times 10^{-3}$ | 32 |
| 25 | 0.125 | $5.1 \times 10^{-5}$ to $5.1 \times 10^{-4}$ | 4 |
| 25 | 0.125 | $5.1 \times 10^{-4}$ to $5.1 \times 10^{-3}$ | 26 |
| 25 | 0.25 | $5.1 \times 10^{-5}$ to $5.1 \times 10^{-4}$ | 1 |
| 25 | 0.25 | $5.1 \times 10^{-4}$ to $5.1 \times 10^{-3}$ | 33 |

The deviation from the theoretical value (59.2 mv) as the solubility limit is approached is within that expected in all cases with 50 percent salt in the electrode.

An electrode for determining chloride was prepared by mixing powdered polytetrafluoroethylene (T6C) with 30 percent by weight of silver chloride in the manner described above. Again an electrode was machined from the resultant bar stock. Saturated potassium chloride was used as the internal filling solution of the electrode. The chloride ion electrode indicated a potential difference of 100 millivolts when measured in a $10^{-5}$ and $10^{-3}$ molar sodium chloride solution. This is in approximate agreement with the theoretically expected value.

An electrode for determining phosphate was prepared by mixing powdered polytetrafluoroethylene (T6C) with 50 percent by weight aluminum phosphate in the manner described above. An electrode having a 0.050 inch membrane thickness was machined from the resultant bar stock. The internal reference electrode was silver-silver chloride and the internal filling solution was composed of $10^{-2}$ molar trisodium phosphate and 4 molar potassium chloride. The phosphate ion electrode indicated a potential difference of 50 millivolts when the concentration of the external trisodium phosphate solution was changed from $10^{-2}$ to $10^{-5}$ molar. This is in satisfactory agreement with the theoretical value of 59.1 millivolts.

The exact manner in which the electrodes according to the instant invention operate is not understood at this time. It is felt, however, that the generally accepted theories for the operation of solid state precipitate electrodes and liquid-liquid membrane electrodes do not satisfactorily explain the operation of electrodes according to the instant invention.

It is clear, however, that the diffusion membrane material according to the instant invention makes an extremely good specific ion electrode. The electrodes are rugged and can be used successfully in various environments. The electrodes have relatively low electrical impedance which may be contrasted favorably with the higher impedances of some of the prior art electrodes. No shielding problems are presented in actual measurements. It should be clear from the above description virtually any specific ion electrode can be prepared in accordance with the instant invention. The electrodes can be used over a wide temperature range and do not prevent any ion exchange leakage problems. Due to the manner in which the electrodes are prepared from the diffusion membrane materials they may be used in relatively high pressure applications where the liquid ion exchange electrodes are not suitable. Membrane materials may be selected so electrodes can be prepared for the detection of either anions or cations.

It will be appreciated that the foregoing is a description of exemplary embodiments of the instant invention.

This is for illustrative purposes only and the instant invention is not to be limited thereby but only by the claims wherein what is claimed is:

1. A method of making a specific ion electrode comprising providing on a tube adapted to contain as an internal filling solution a solution of the ion to be measured and containing an internal reference electrode, a diffusion membrane as a barrier between a sample to be measured and the internal filling solution, the membrane having been prepared by the steps of:
   a. mixing a polyfluoroalkene resin with a substantially water insoluble salt of the ion to be detected selected from the group consisting of aluminum phosphate, lanthanum fluoride, barium sulfate, silver chloride, silver bromide, silver iodide, and cadmium phosphate;
   b. molding and sintering the resultant mixture to provide a bar stock; and
   c. forming the bar stock into a diffusion membrane.

2. The method of claim 1 wherein the salt comprises from about 20 percent to about 75 percent by weight of the mixture.

3. The method of claim 2 wherein the salt comprises about 30 percent by weight of the mixture.

4. The method of claim 1 wherein the salt is added in an amount insufficient to impair the structural strength of the resulting bar stock.

5. The method of claim 1 wherein the polyfluoroalkene is polytetrafluorethylene.

6. The method of claim 1 wherein the salt is in the form of particles of a size from about 10 to about 1,000 microns.

7. The method of claim 1 wherein, after mixing, the salt has a particle size from about $1 \times 10^{-4}$ to about $50 \times 10^{-4}$ centimeters.

8. The method of claim 7 wherein the molding pressure is from about 6,000 to about 20,000 lbs. per square inch.

9. The method of claim 1 wherein the bar stock is formed into a diffusion membrane from about 0.030 to about 0.25 inches thick.

10. A specific ion electrode comprising:
    a. a tube adapted to contain, as an internal filling solution, a solution of the ion measured;
    b. an internal reference electrode positioned in the tube;
    c. a diffusion membrane at least across one end of the tube so as to function as a barrier between a sample to be measured and the internal filling solution, which comprises a polyfluoroalkene resin and a substantially water insoluble salt of the ion to be detected selected from the group consisting of aluminum phosphate, lanthanum fluoride, barium sulfate, silver chloride, silver bromide, silver iodide, and cadmium phosphate, in admixture therewith.

11. The specific ion electrode of claim 10 wherein, in the diffusion membrane, the salt comprises from about 20 percent to about 75 percent by weight of the mixture.

12. The specific ion electrode of claim 11 wherein, in the diffusion membrane, the salt comprises about 30 percent by weight of the mixture.

13. The specific ion electrode of claim 10 wherein, in the diffusion membrane, the mixture has been molded and sintered together.

14. The specific ion electrode of claim 13 wherein, in the diffusion membrane, the salt is present in an amount insufficient to impair the structural strength of the structure.

15. The specific ion electrode of claim 10 wherein, in the diffusion membrane, the salt is barium sulfate and the ion to be detected is sulfate.

16. The specific ion electrode of claim 10 wherein, in the diffusion membrane, the salt is silver chloride and the ion to be detected is chloride.

17. The specific ion electrode of claim 10 wherein, in the diffusion membrane, the salt is aluminum phosphate and the ion to be detected is phosphate.

18. The specific ion electrode of claim 10 wherein, in the diffusion membrane, the polyfluoroalkene resin is polytetrafluoroethylene.

19. The specific ion electrode of claim 10, wherein in the diffusion membrane, the salt is in the form of particles of a size from about $1 \times 10^{-4}$ to about $50 \times 10^{-4}$ centimeters.

20. The specific ion electrode of claim 10 wherein the diffusion membrane has a thickness of from about 0.030 to about 0.25 inches.

* * * * *